(12) United States Patent
Allan et al.

(10) Patent No.: US 7,472,032 B1
(45) Date of Patent: Dec. 30, 2008

(54) ADAPTIVE MULTI-AXIS SENSOR ARRAY

(75) Inventors: David W Allan, Fountain Green, UT (US); John A Kusters, Cupertino, CA (US); Gus R German, Fountain Green, UT (US)

(73) Assignee: Allan Space-Time Solutions, LLC, Fountain Green, UT (US)

( * ) Notice: Subject to any disclaimer, the term of this patent is extended or adjusted under 35 U.S.C. 154(b) by 0 days.

(21) Appl. No.: 11/821,852

(22) Filed: Jun. 25, 2007

(51) Int. Cl.
*G01C 21/00* (2006.01)

(52) U.S. Cl. .................... 702/104; 368/159; 701/213; 702/65; 702/92

(58) Field of Classification Search .............. 702/65, 702/92, 94, 104, 106, 128; 310/348, 360, 310/361; 331/69, 70; 368/159; 701/213; 342/386
See application file for complete search history.

(56) References Cited

U.S. PATENT DOCUMENTS 5,444,641 A * 8/1995 White ................... 702/65
7,046,584 B2 * 5/2006 Sorrells et al. ............ 368/159
2008/0088507 A1 * 4/2008 Smith et al. ............. 342/386
2008/0091350 A1 * 4/2008 Smith et al. ............. 701/213

* cited by examiner

Primary Examiner—John H Le
(74) Attorney, Agent, or Firm—Richard K Thomson (57) ABSTRACT

A sensor array made up of 2n piezoelectric oscillators (preferably paired quartz oscillators) is provided in which n equals the number of axes of interest and each one of the pairs of oscillators has a principle axis directed oppositely from the other of its pair. A controller which preferably includes a microprocessor, makes use of the dynamic relationships of the sensors in the array to adaptively assess the magnitude of weighting factors needed to correct the output signal from each oscillator for environmental and systematic effects to provide optimum frequency and phase output for computing position, velocity, and acceleration. Preferably, a seventh reference oscillator is provided in the center of the array which is canted relative to each of the three orthogonal axes by 45°. This adaptive sensor array is capable of determining position within one meter along any of the x, y, and z axes without the need for any external (e.g., GPS) signal. In addition, unlike other sensor systems, it is capable of providing local vertical on a continuous basis. The array can also determine if an object is moving in any translational or rotational direction, within the measurement capabilities of the system.

18 Claims, 9 Drawing Sheets

EQUATE stabilized array timing oscillator

SC-Cut Frequency vs. Temperature Curves

HEXAGONAL AXIS

Fig. 4B

ORTHOGONAL AXIS

I. R. E. Orientation Angles

EQUATE stabilized array timing oscillator

ADAPTIVE MULTI-AXIS SENSOR ARRAY

BACKGROUND AND SUMMARY OF THE INVENTION

The present invention is directed to position determining hardware. More particularly the present invention is directed to an adaptive multi-axis sensor array known as Ensemble of Quartz Clocks Adapting To the Environment (EQUATE).

Systems capable of providing position, acceleration and velocity data are well known in the prior art. The more common ones utilize signals provided by a Global Position System (GPS) which are fed to an interface with a navigation computer to provide position, velocity and time reference signals. Other systems employ microwave signals to provide a localized solution as for an airport. Radio transmitters are used in certain applications to triangulate to provide independent navigation data.

Existing position detecting systems such as satellite based systems including GPS, VOR, cell tower signals, other microwave signals, have significant limitations. Although these systems provide useful information for vehicular navigation (both earthbound and space/airborne), communications links, geodesy and mapping, to name a few, each has its problems. Some areas have limited/no access to microwave signals. Further, such signals are subject to jamming, spoofing, or otherwise degraded, such that significant distortion in accurate positioning determination is created. Each of the existing systems require constant data monitoring and updating to work properly. Some solutions propose combining several of these existing systems in an attempt to remedy the short-comings of each. However, these attempts to provide a suitable "fail-safe" system are doomed to failure if updated signal information is unavailable for whatever reason. Further, current applications including deep sea exploration, navigation in polar icecap regions with only minimal satellite GPS data available, determining position in caves or buildings which are not microwave penetrable, deep oil exploration, precisely locating orbiting spacecraft, celestial objects, or objects on the dark side of the moon, find no solution in existing systems. Most of these systems do not work well in "urban canyons" due to signal blockage and multi-path problems.

Advanced navigational systems currently available employ Kalman filters or some variation such as an extended or adaptive Kalman filter, to improve the accuracy of the output from the positioning device. This is required since the signal acquisition device acquires both the signal and some degree of "noise". Kalman filters and their variants, are adaptive, i.e., they modify the initial recorded data to adjust for the signal noise. Kalman filters, which typically interpolate or extrapolate to provide a suitable estimate for error correction, are designed to operate most effectively in correcting for linear variations in a continuous data stream. If the errors require the system to accommodate a non-linear estimation, involve a discontinuous data stream, or noise that involves non-stationary modeling, the effectiveness of the Kalman filter based system is significantly hampered/limited.

Some hybrid systems involving inertial measurements are capable of overcoming short-term errors in receiving microwave signals. However, it is critical in these systems that the data streams from the GPS and the data stream from the Inertial Measurement Units (IMU) be precisely aligned with respect to time. To accomplish this, the time reference signal must be of the highest precision. The signals from the available systems are of insufficient precision.

It is among the objects of the present invention to overcome the limitations and deficiencies of the prior art systems. Particularly, the signal provided by the EQUATE oscillator ensemble provides a signal of the necessary precision enabling the tight synchronization needed for the two data streams. In addition, the EQUATE oscillator array uses an Allan filter which is capable of providing accurate signal correction even when non-linear corrections are necessary and even though non-continuous external data is available, and even though the noise my be non-stationary in nature. What is more, the EQUATE array can provide precision position signals when no external data stream is available.

The EQUATE array comprises a plurality of 2n piezoelectric oscillators arrayed in pairs, where n is the number of axes of interest, and each member of a respective pair has its principal operational axis disposed opposite that of its associated oscillator. Each oscillator has a resonator and ancillary circuitry and is subject to both i) environmental effects including acceleration, mechanical shock, temperature variations, and vibration; and ii) systematic effects including aging, frequency drift, and time offset. Controller means is provided which employs dynamic relationships between the plurality of oscillators in the ensemble to determine a magnitude of correction needed, and to produce estimated weighting factors for each oscillator to correct for both the environmental and the systematic effects. Preferably, the controller means includes a microprocessor and a signal conditioner which transforms input and output signals into a digital readout. The oscillators are also, preferably, quartz crystals or other material having similar anisotropic characterization properties.

Most preferably, the ensemble is configured as 3 pairs of opposed oscillators oriented along three orthogonal axes to cover all possible axial and rotational axes of interest. At least one of the quartz oscillators, and preferably each, is a stress compensated (SC) cut resonator operating in dual mode, C mode for frequency output, and B mode for temperature compensation. This oscillator array will be embedded in an application specific integrated circuit (ASIC) to reduce spacial requirements and power requirements. Specifically, embedding the ensemble in an ASIC reduces total occupied space to less than 0.8 cc and power requirements to 15 mW. In one preferred embodiment, a seventh oscillator canted by 45° to each of the x, y, and z axes is provided to supply a reference signal, as well as a consistency check on the acceleration readings obtained from the other three pairs. Alternatively, a reference signal may be supplied by an external source. EQUATE is robust, being capable of sensing statistically significant errors and not be perturbed by their effects. The oscillator array is provided with a housing of rugged construction enabling it to withstand a temperature range varying between −55° C. and 300° C. without detrimental effect on signal output and withstanding the vacuum of deep space, the high pressure and temperature of well bore conditions, and the high pressure and humidity of oceanographic terrain.

The sensor array for EQUATE overcomes the problems of double integration of errors common to accelerometry in determining position (i.e., integration of acceleration to determine velocity, velocity to determine position; an error in the acceleration data is magnified with each integration). The theoretical error-of-position dispersion rate for this technique is a function of $\tau^{1/2}$ and a feasibility study has determined that the actual dispersion rate is $0.7 \times \tau^{1/2}$ mm where r is time measured in seconds. EQUATE array achieves exceptional accuracy over extended periods with the error only growing to a distance only slightly greater than 1 meter over an entire month, better than the accuracy performance of GPS.

The EQUATE array has been specifically designed for low power consumption such that it can be easily incorporated into handsets, satellites, and the like. The algorithm will compensate for shock, vibration, and acceleration perturbations associated with its transport. It can operate over large ambient temperature ranges (including military temperature ranges of −40° C. to 125° C.) without the need for an oven. Further, the sensor array automatically compensates for effects typically occurring in quartz-crystal oscillators as a result of temperature changes.

The EQUATE sensor array is unlike other systems whose accuracy degrades with time. EQUATE's algorithm uses a statistical theorem for whiteness to optimize the estimates of the temperature coefficients unique to each sensor ensemble. It adaptively learns and updates its acceleration sensitivity coefficients so that it improves its performance with time. So, in contrast to most clock technologies that necessarily attempt to shield their systems from environmental effects of temperature, shock, vibration, and acceleration, EQUATE uses these environmental effects to upgrade parameter sensitivity estimates. By continually upgrading these parameters, EQUATE's environmental immunity actually improves with time turning the environmental effects harmful to other systems, into tools for enhancing performance.

The time-ensemble control methodology, including algorithms, employed in the EQUATE sensor array has been proven in oscillator hardware at Oak Ridge National Laboratory (ORNL) to provide optimum timekeeping performance ensuring superior output than the best clock utilized in the EQUATE ensemble. Further, this methodology enhances the performance of even the worst clock and can better deal with measurement noise and flicker noise than existing Kalman approaches.

EQUATE's electronics can be optimized by using the latest ultra-low noise SiGe devices and circuitry and could be nicely implemented with custom ORNL-designed mixed-signal SiGe integrated circuits to provide absolutely the lowest noise, power, temperature/shock compensation available in the smallest package.

The EQUATE sensor array can be steered using an external reference, such as GPS or even advanced common-view GPS synchronization algorithms, which can utilize the high precision of the EQUATE technology. This information also provides a calibration reference from auxiliary sensor, should GPS be unavailable for any reason. EQUATE can "flywheel" the latest values forward with very high precision and low dispersion of error estimates.

The EQUATE algorithms allow for the measurement of and removal of typical systematic effects plaguing quartz-crystal oscillators, such as time offset, frequency offset, and frequency drift, for example. The updating of the coefficients for removal of these systematic effects can be continuous or intermittent.

Unlike most accelerometers, the EQUATE sensor array can sense both acceleration effects as well as instantaneous velocity. This is due to the linear relationship between acceleration and velocity. By measuring phase directly, the instantaneous velocity can be determined. By eliminating the step of integrating frequency/acceleration to obtain velocity, EQUATE avoids the long-term performance degradation associated with integration of errors. EQUATE can provide measurements of translational and rotational motion. In addition, EQUATE can measure local vertical direction. In performing this measurement, it uses the earth's gravitational field as a calibration reference. Feasibility studies have verified accuracies of these measurements with errors of not greater than 0.4°. If the EQUATE sensor array is used with a magnetometer or similar auxiliary signal, it can provide measurements of orientation. EQUATE has the ability to integrate out short-term magnetometer fluctuations and ascertain anomalous magnetic environmental perturbations.

With respect to timing, EQUATE is, to a large degree, self-calibrating, knowing the performance of each of the sensors in the ensemble and, hence, of the entire EQUATE ensemble. As a result, the timing error dispersion rate for EQUATE is minimized and can be estimated from the ensemble elements.

With regard to position, EQUATE is self-calibrating, measuring the effects of low frequency dispersive processes common to clocks and oscillators, such as white noise, flicker noise, and random-walk noise, and removing, to a large degree, the effects these dispersive processes would otherwise cause. Accordingly, EQUATE's position error performance for a small, low-powered device is unsurpassed when operating independently of external signals, both in the short-term and long-term operations.

The EQUATE sensor array is unique in that once it has fiducial reference points in space and time, it can flywheel both the time and the position, which results in a continuous estimate of velocity, acceleration, and orientation. The local vertical is determined independently from a fiducial reference.

The pairing of the six oscillators in the preferred embodiment enable the EQUATE sensor array to respond maximally to forces in the ±x, ±y, and ±z directions. Reversing the sensitivity directions along a single axis allows the measurement of approximately double the frequency change as a force along that particular axis causes the two paired oscillators to be offset in opposite directions. These changes can be measured singly against the more stable ensemble frequency reference for individual sensitivity calibration, or compared against each other to measure the total change in frequency due to fore in the sensitivity direction.

The orthogonal orientation of the sensitivity axes of the three pairs of oscillators allows measurement of torque forces during rotation about any axis. This can be distinguished from translational forces, as the torque forces are either radially inward or outward. This causes the frequency changes in opposing oscillators which have a moment around the rotational axis to both move in the same direction (both positive or both negative).

At least one, and possibly more, additional oscillator(s) (i.e., reference oscillator) can be placed to have equal sensitivity to +x/+y/+z and −x/−y/−z as a measure of consistency. The algorithms provide a constant health status of the EQUATE sensor array, making the system extremely robust and reliable.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
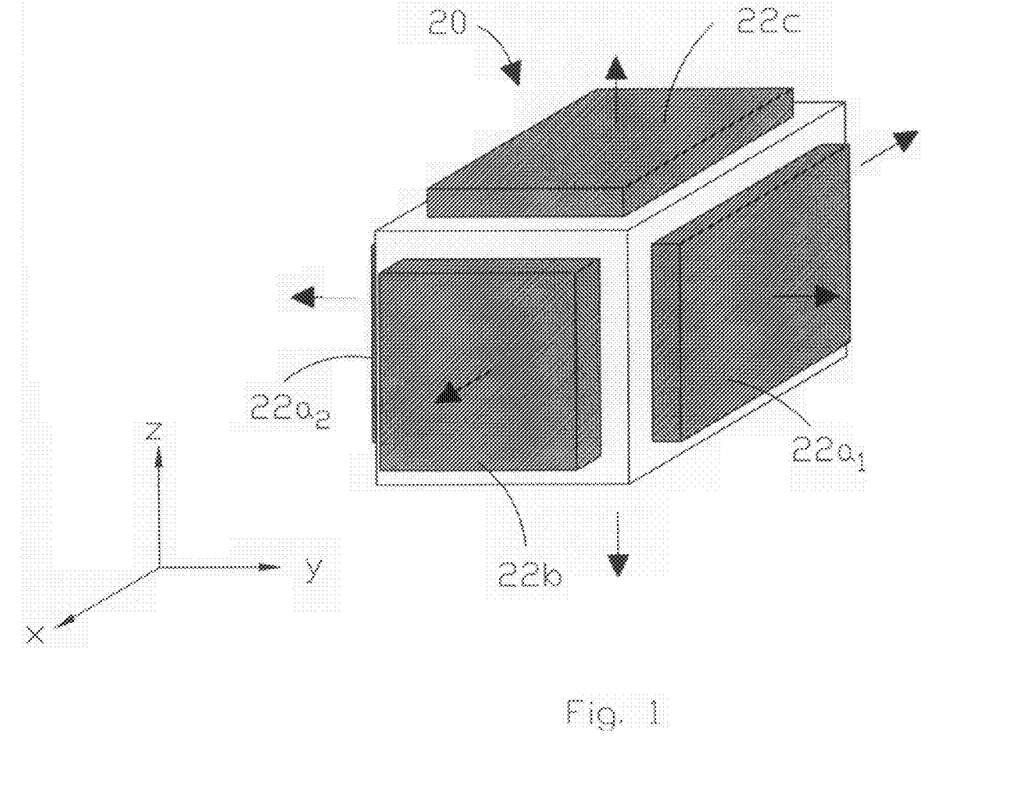
FIG. 1 is a schematic perspective view of a first embodiment of the multi-axis sensor of the present invention.
Figure 2:
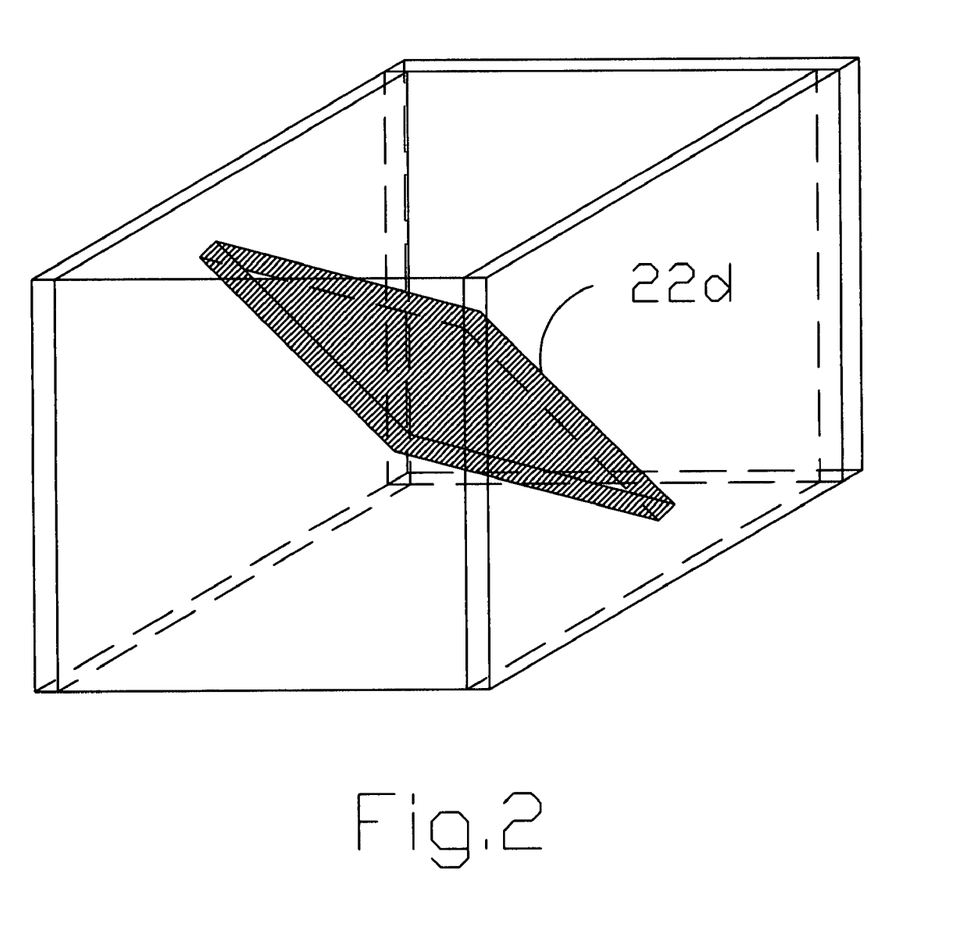
FIG. 2 is a schematic perspective view of a seventh sensor which may be used with the multi-axis sensor of the first embodiment.

A schematic depiction of a first embodiment of the adaptive multi-axis sensor array or ensemble of the present invention is depicted in FIG. 1 generally at 20. As shown in FIG. 1, the multi-axis sensor array comprises 3 pairs of opposed piezoelectric oscillators 22. By way of example, oscillators $22a_1$, $22a_2$ have primary axes extending in opposite directions along, for example, the y-axis, while oscillators $22b$ extend along the x-axis and $22c$ extend in opposite directions along the z-axis. While sensor array 20 is configured to permit data to be gathered regarding all 3 orthogonal longitudinal axes and, by virtue of the paired oscillators 22, all three rotational axes as well, it is envisioned that other applications may only require data gathering to one or two of the principle axes. Accordingly, the invention is directed to a plurality of 2n piezoelectric oscillators, where n is the number of axes of interest, each piezoelectric oscillator of the plurality of 2n being one of a pair of the piezoelectric oscillators. While it is preferred that the piezoelectric oscillator of choice will be a quartz crystal due to its highly stable characteristics, for certain applications, other piezoelectric materials may serve as well. Most preferably, a seventh oscillator $22d$ is housed internally of the remaining oscillators of the ensemble (FIG. 2). Oscillator $22d$ is canted by 45° relative to each of the orthogonal planes in which sensors $22a$, $22b$ and $22e$ lie to as to provide a response to any stimulus regardless of direction, which becomes a component reference signal that can be compared to the output of each pair of sensors. Each quartz oscillator contains quartz resonator and the ancillary electronic circuitry needed to interface with an associated microprocessor. For some applications, it may be desirable for the oscillator circuits to be tunable; however, this is not necessary since the adaptive capabilities of sensor array 20 enables it to adjust the output in a manner superior to tuning as discussed hereafter.

Each of the oscillators is susceptible to environmental effects including acceleration, mechanical shock, temperature variations, and vibration, as well as being subject to systematic effects including aging, frequency drift, and time offset. Each of these parameters can contribute to an error in the frequency and/or phase of the signal produced by the oscillator which is fed through a signal processing unit to the microprocessor. An algorithm identified as an Allan filter built into the microprocessor, assesses the nature and magnitude of noise associated with each component, determines a weighting factor appropriate for the noise in the signal which minimizes/eliminates the effect of the error in the resultant output signal.

Figure 3A:
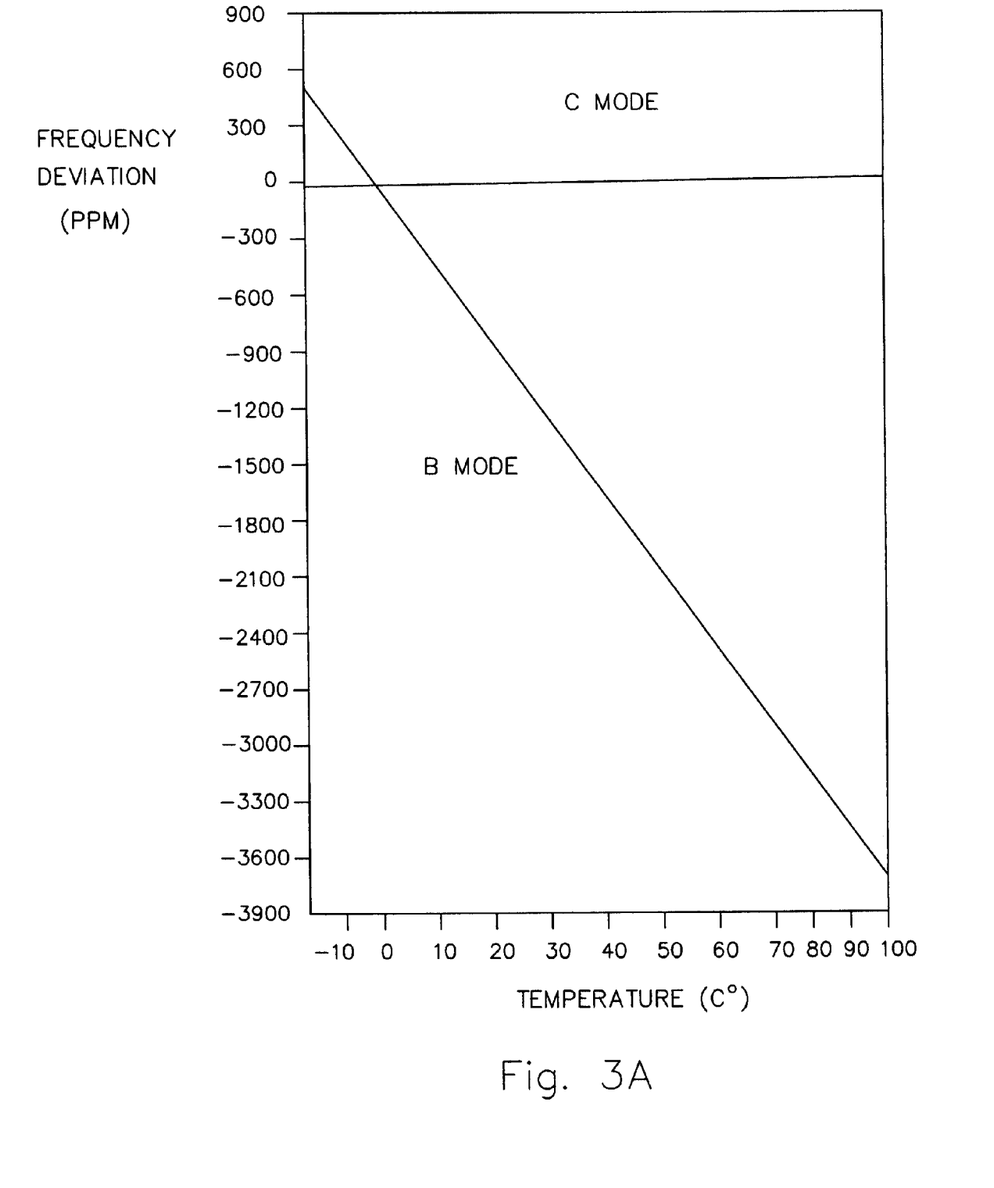
FIG. 3 is a graph showing an exemplary plot of B and C mode responses for quartz oscillators.
Figure 3B:
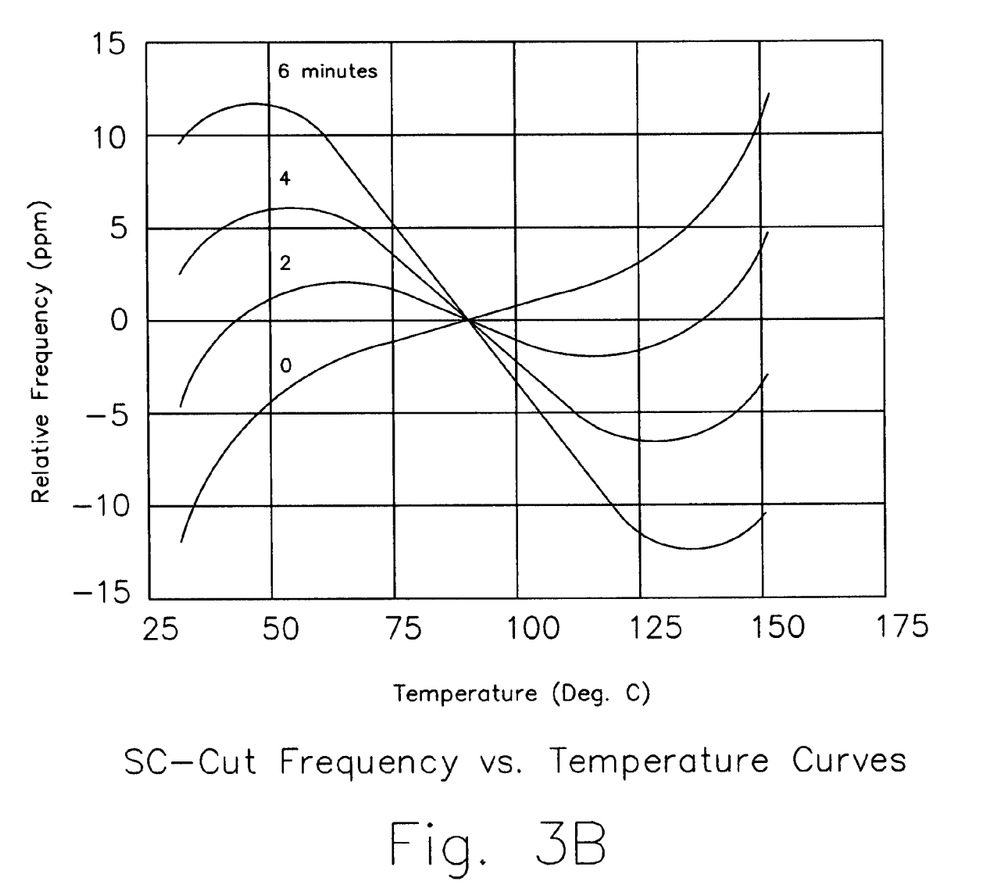

The use of quartz crystals enables the dual modality of the oscillators to provide a temperature measurement which enables compensation for thermal differences. As seen in FIG. 3A, the frequency response of the B mode varies significantly over temperature ranges while the C mode is fairly constant. Looking closer at the C mode using a smaller scale (FIG. 3B), there is actually some variation of the frequency response relative to temperature and by using the B mode to establish the environmental temperature to which the array is exposed, and knowing the quartz angle selected, the relative frequency can be determined. The use of dual mode quartz eliminates the need for an oven reducing both the spatial and power requirements for the sensor array. The sensor ensemble 20 may have an embedded Application Specific Integrated Circuit (ASIC) to minimize spatial requirements as well as power requirements. It is envisioned that the overall space needed to house the sensor array 20 will be less than 0.8 cc and the power will not exceed 15 mW.

Figure 4A:
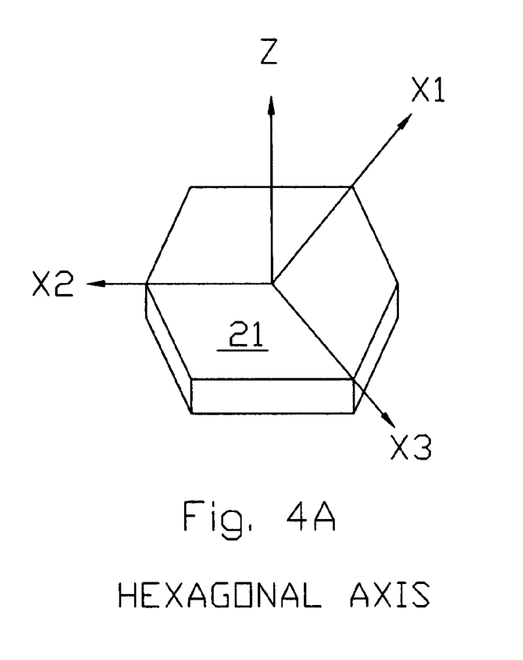
FIG. 4A is a schematic view of a piezoelectric oscillator with hexagonal orientation.
Figure 4B:
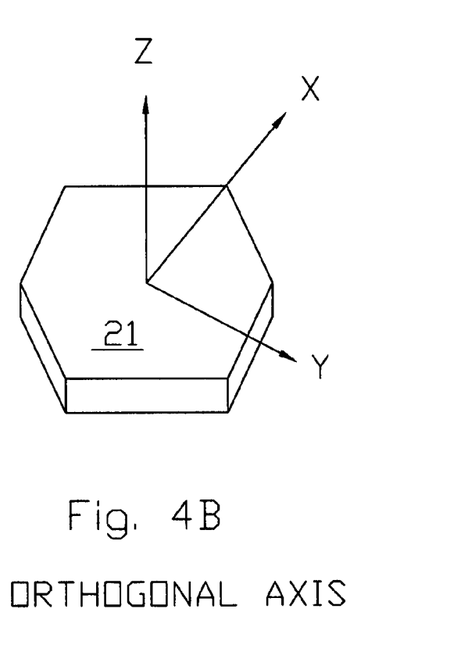
FIG. 4B is a schematic view of a piezoelectric oscillator with typical orthogonal orientation.
Figure 4C:
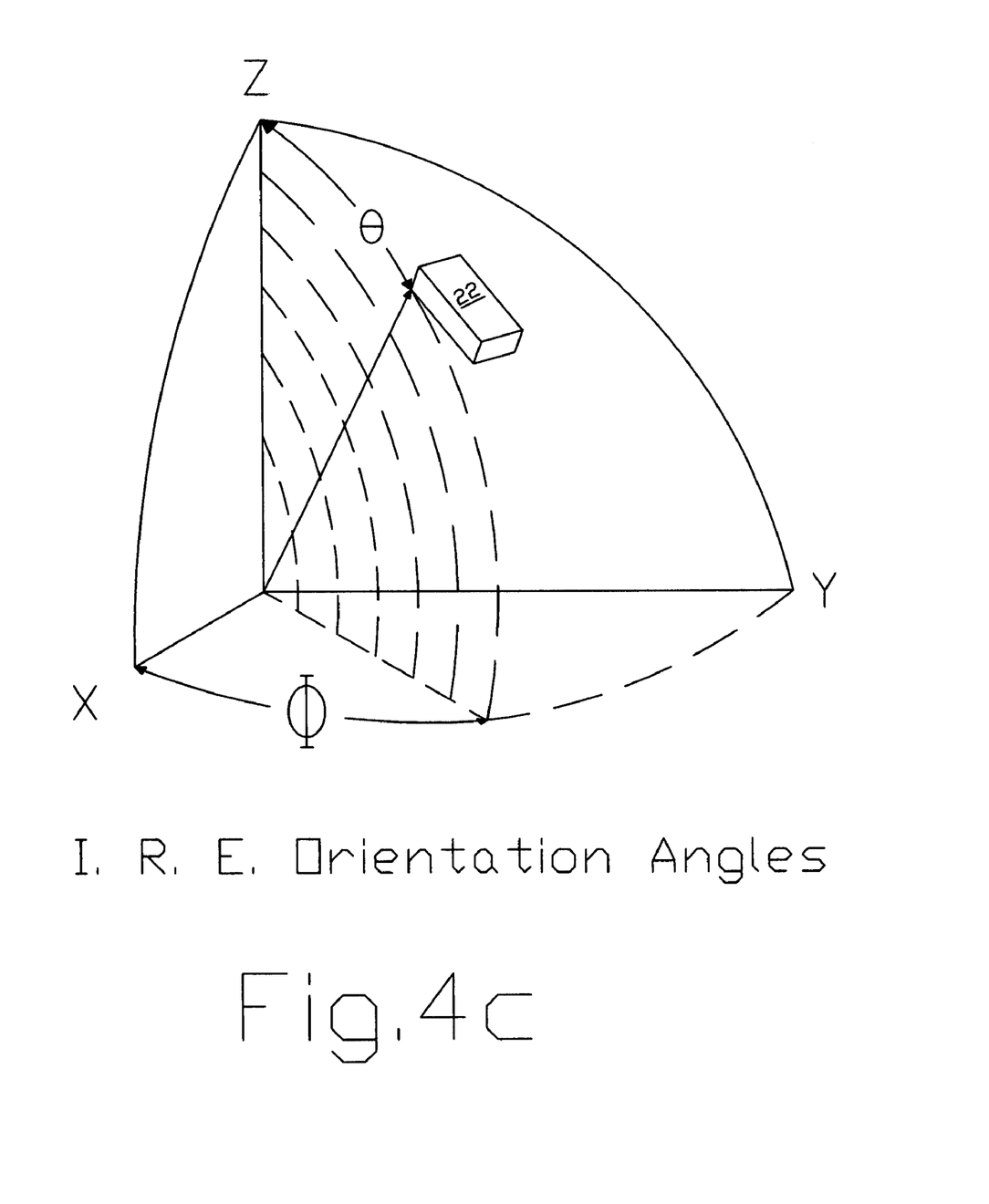
FIG. 4C is a graph depicting how an oscillator may be oriented to provide its principal axes at any angular orientation.

As depicted in FIG. 4A, quartz crystal 21 has three co-planar x (electrical) axes spaced by 120° and an orthogonal z (optical) axis. By assigning one of the x-axes the role as the primary electrical axis (by orientation of the quartz crystal within the oscillator), the electrical signals received along the x2 and x3 axes can be ignored. The y-(or mechanical) axis is assigned, being orthogonal to both the x- and z-axes (FIG. 4B). The assignment is done in accordance with a method depicted in FIG. 4C. This method of orienting the quartz crystal within the oscillator 22 is done in accordance with the Institute of Radio Engineers (I.R.E.) Orientation Angles. The two angles are identified as θ and Φ. θ is measured from the xy plane and Φ from the xz plane. Orienting the quartz crystal to have two primary axes is known as double rotation of the quartz.

Figure 5A:
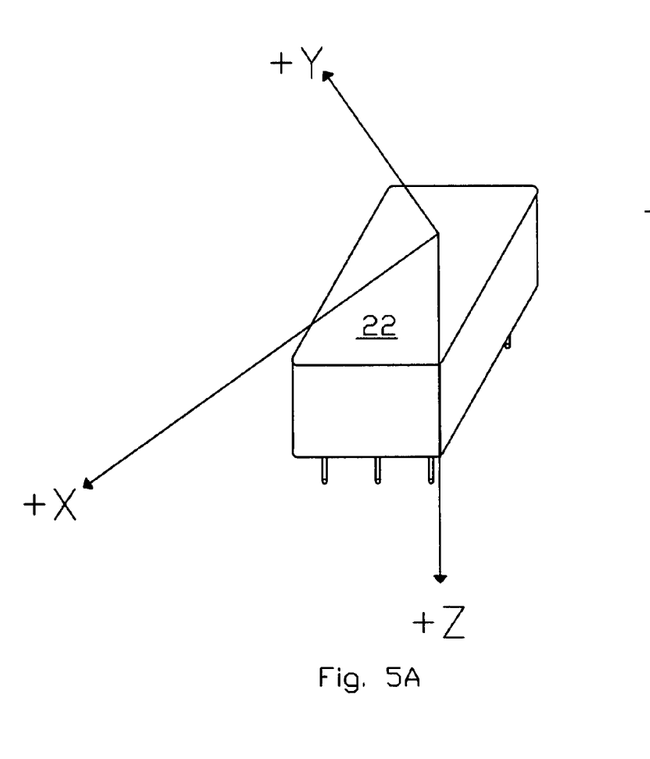
FIG. 5A is a perspective view of a piezoelectric oscillator depicting the orientation of its primary axes.
Figure 5B:
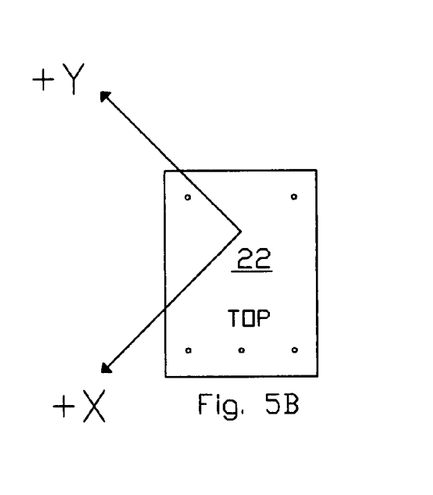
FIG. 5B is a top view of the oscillator of FIG. 5A.
Figure 5C:
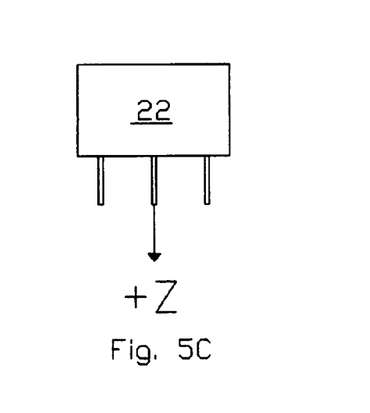
FIG. 5C is a front view of the FIG. 5A oscillator.

FIGS. 5A-5C depict an exemplary orientation of the axes of the quartz in the piezoelectric oscillator 22 used in the present invention. For most of the applications of interest for sensor array 20, only the orientation of the electrical axis is meaningful. The orientation of the x-, y-, and z-axes of the quartz used in the oscillator 22 should not be confused with the orientation of the axes of the sensor array 20. The axes of the array 20 are independent of the axes of the quartz used in the oscillators 22.

Figure 6A:
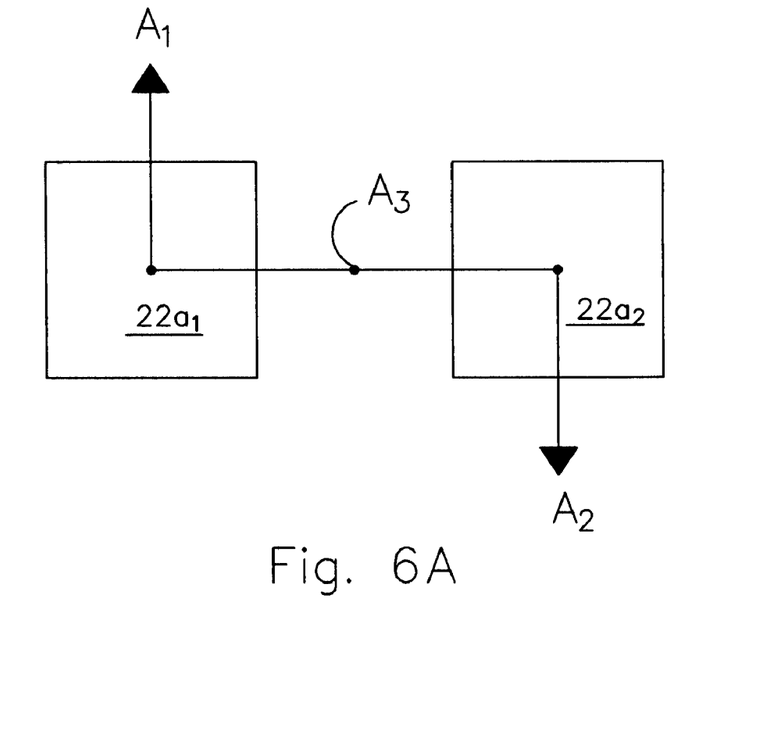
FIG. 6A is a schematic diagram of paired oscillators aligned to provide opposing axial data as well as rotational data.
Figure 6B:
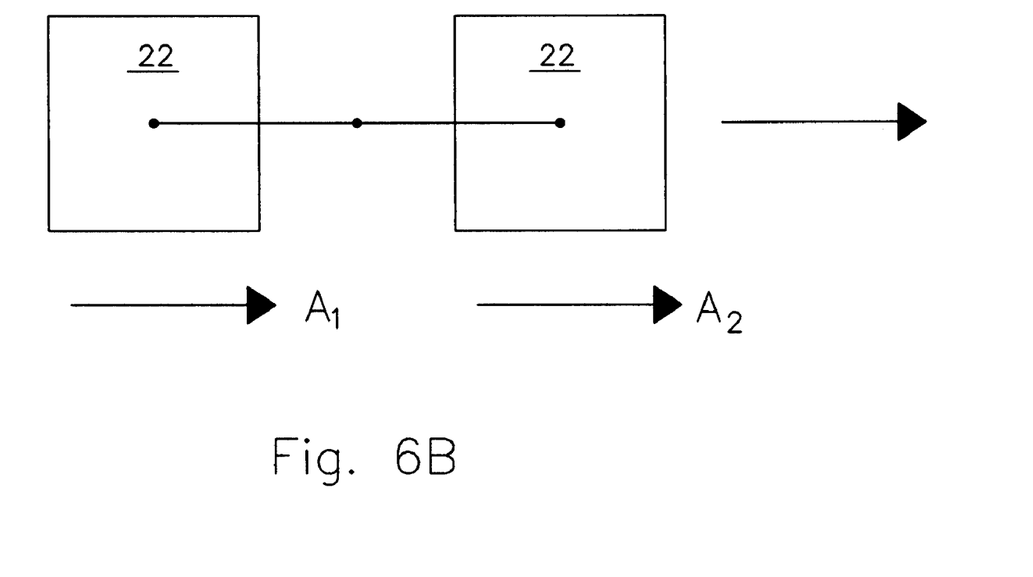
FIG. 6B is a schematic depiction showing oscillators having their principal operating axes aligned; and, FIG. 7 is a line schematic of a possible electronic circuit which may be used with the multi-axis sensor of the present invention.

FIG. 6A demonstrates how alignment of the principle axes $A_1$ and $A_2$ of oscillators $22a_1$, $22a_2$ in opposite directions enable data to be gathered regarding the rotational moment about axis $A_3$. FIG. 6B, on the other hand, depicts how aligning principle axes $A_1$ and $A_2$ of oscillators $22a_1$, $22a_2$ provide directional information along axis $A_4$ but no data regarding rotational moments about axis $A_3$.

Figure 7:
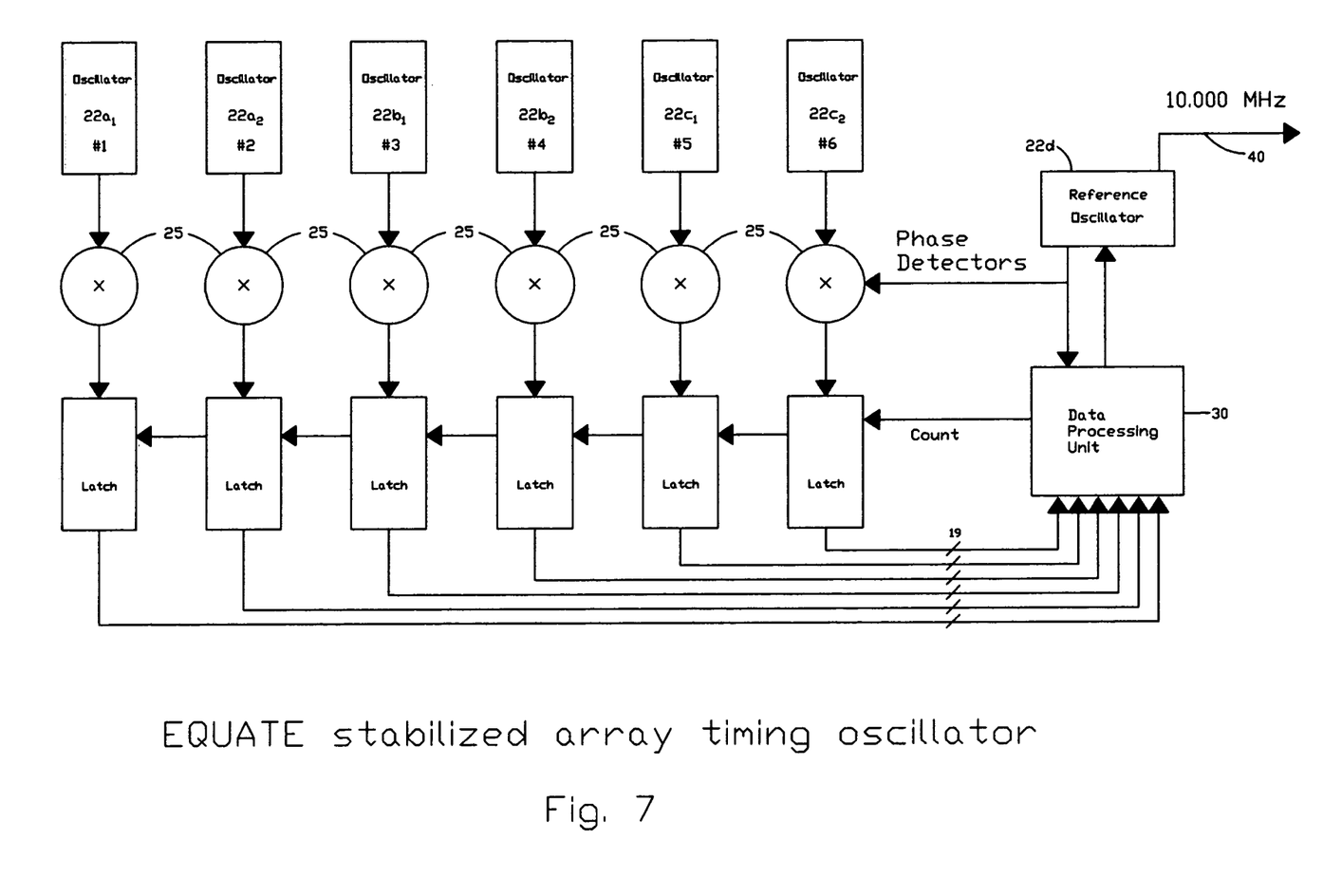

FIG. 7 is a schematic depiction of a portion of the electronic circuitry utilized to implement EQUATE. Frequency outputs from oscillators $22a_1$, $22a_2$, $22b_1$, $22b_2$, $22c_1$, and $22c_2$ are fed through phase detectors 25 and the frequency and phase data is fed to a data processing unit 30 which preferably includes a microprocessor. The data processor 30 applies algorithmic adjustments to the various signals to maximize the accuracy of the data. The output of reference oscillator $22d$ is fed to the data processor 30 as a cross check to verify the data received from the other oscillators $22a_1$-$22c_2$ before producing the output signal 40.

The EQUATE sensor array 20 is capable of determining precise position of an object with high precision (i.e., within one meter) along all three dimensional axes, determining local vertical, and detecting movement within the computational error of the system.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

We claim:

1. A multi-axis sensor arrangement, comprising:
   a) a plurality of 2n piezoelectric oscillators including at least three pairs of piezoelectric oscillators, wherein n is the number of axes of interest, each piezoelectric oscillator of said plurality of 2n being one of a pair of said piezoelectric oscillators, each oscillator of said pair
      i) having a principal operational axis disposed in a direction opposite to the other of said pair,
      ii) including a resonator and ancillary electronic circuitry,
      iii) being subject to environmental effects including acceleration, mechanical shock, temperature variations, and vibration,
      iv) being subject to systematic effects including aging, frequency drift, and time offset,
      said plurality of 2n piezoelectric oscillators defining an oscillator ensemble capable of providing outputs including each of frequency and phase readings;
   b) controller means employing dynamic relationships between said plurality of said oscillators in said ensemble to determine a magnitude of correction needed, and to produce estimated weighting factors for each said frequency and phase reading output from each said oscillator to correct for both said environmental and said systematic effects.

2. The multi-axis sensor arrangement of claim 1 wherein said controller means further comprises a microprocessor.

3. The multi-axis sensor arrangement of claim 2 wherein said controller means further comprises a signal conditioner which transforms all input and output signals into a digital readout.

4. The multi-axis sensor arrangement of claim 1 wherein each of said piezoelectric oscillators is quartz.

5. The multi-axis sensor of claim 4 wherein at least one said quartz oscillator is an stress compensated cut resonator operating in dual mode, C mode for frequency output, and B mode for temperature compensation over a large temperature range without the need for an oven.

6. The multi-axis sensor arrangement of claim 4 wherein each said quartz oscillator is embedded in an application specific integrated circuit to reduce spatial requirements and power requirements.

7. The multi-axis sensor arrangement of claim 6 wherein each said quartz oscillator has three known crystallographic axes—an electrical axis, a mechanical axis, and an optical axis, each of said three known crystallographic axes being aligned with one of three orthogonal axes x, y and z.

8. The multi-axis sensor arrangement of claim 6 wherein embedding each said quartz oscillator in an application specific integrated circuit reduces spatial requirements to less than 0.8 cc and power requirements to 15 mW.

9. The multi-axis sensor arrangement of claim 1 wherein n equals 3 corresponding to three orthogonal x, y, and z axes and said 2n piezoelectric oscillators comprise three pairs, each of said pairs oriented along one of said three orthogonal axes.

10. The multi-axis sensor arrangement of claim 9 further comprising reference means to provide a seventh input signal to said controller means.

11. The multi-axis sensor arrangement of claim 10 wherein said reference means comprises a receiver for an externally provided signal.

12. The multi-axis sensor arrangement of claim 10 wherein said reference means comprises a seventh oscillator which is canted relative to each of said three orthogonal axes of said piezoelectric oscillator pairs.

13. The multi-axis sensor arrangement of claim 12 wherein said seventh oscillator is canted by 45° relative to each of said three orthogonal axes.

14. The multi-axis sensor arrangement of claim 1 wherein said plurality of piezoelectric oscillators are in a housing of rugged construction such that the array is capable of operating in a temperature range of between −55° C. and 300° C. without detrimental effect on signal output and withstanding the vacuum of deep space, the high pressure and temperature of well bore conditions, and the high pressure and humidity of oceanographic terrain.

15. A method of providing accurate position location within one meter relative to a fiducial point along any of three orthogonal axes, said method comprising the steps of
   a) providing a multi-axis sensor arrangement which includes
      i) a plurality of oscillators including at least three pairs of piezoelectric oscillators, each oscillator of said pair
         α) having a principal operational axis disposed in a direction opposite to the other of said pair,
         β) including a resonator and ancillary electronic circuitry,
         γ) being subject to environmental effects including acceleration, mechanical shock, temperature variations, and vibration,
         δ) being subject to systematic effects including aging, frequency drift, and time offset,
      said three pairs of piezoelectric oscillators defining an oscillator ensemble capable of providing outputs including each of frequency and phase readings;
   b) utilizing controller means which employs dynamic relationships between said plurality of said oscillators in said ensemble to determine a magnitude of correction needed, and to produce estimated weighting factors for each said frequency and phase reading output from each said oscillator to correct for both said environmental and said systematic effects.

16. A method of determining local vertical on a continuous basis with high accuracy comprising the steps of
   a) providing a multi-axis sensor array which includes
      i) a plurality of oscillators including at least three pairs of piezoelectric oscillators, each oscillator of said pair
         α) having a principal operational axis disposed in a direction opposite to the other of said pair,
         β) including a resonator and ancillary electronic circuitry,
         γ) being subject to environmental effects including acceleration, mechanical shock, temperature variations, and vibration,
         δ) being subject to systematic effects including aging, frequency drift, and time offset,
      ii) reference means to provide a reference signal to said sensor array, said reference signal having at least a portion which is non-axisymmetric with said at least one pair of piezoelectric oscillators;

said at least three pairs of piezoelectric oscillators defining an oscillator ensemble capable of providing outputs including each of frequency and phase readings;

b) utilizing controller means which employs dynamic relationships between said plurality of said oscillators in said ensemble to determine a magnitude of correction needed, and to produce estimated weighting factors for each said frequency and phase reading output from each said oscillator to correct for both said environmental and said systematic effects.

17. A method of determining absence of motion of an object, said method comprising the steps of a) providing a multi-axis sensor arrangement which includes
   i) a plurality of oscillators including at least three pairs of piezoelectric oscillators, each oscillator of said pair
      α) having a principal operational axis disposed in a direction opposite to the other of said pair,
      β) including a resonator and ancillary electronic circuitry,
      γ) being subject to environmental effects including acceleration, mechanical shock, temperature variations, and vibration,
      δ) being subject to systematic effects including aging, frequency drift, and time offset,
   said three pairs of piezoelectric oscillators defining an oscillator ensemble capable of providing outputs including each of frequency and phase readings;
b) utilizing controller means which employs dynamic relationships between said plurality of said oscillators in said ensemble to determine a magnitude of correction needed, and to produce estimated weighting factors for each said frequency and phase reading output from each said oscillator to correct for both said environmental and said systematic effects;

whereby translational and rotational movement of an object can be determined within an error of said multi-axis sensor arrangement.

18. A multi-axis sensor arrangement, comprising:

a) a plurality of 6 piezoelectric oscillators, each piezoelectric oscillator of said plurality being one of a pair of said piezoelectric oscillators forming three orthogonal pairs of oscillators, each oscillator pair positioned along one of an x-, y-, and z-axis and each oscillator of said pair
   i) having a principal operational axis disposed in a direction opposite to the other of said pair,
   ii) including a resonator and ancillary electronic circuitry,
   iii) being subject to environmental effects including acceleration, mechanical shock, temperature variations, and vibration,
   iv) being subject to systematic effects including aging, frequency drift, and time offset,
   said plurality of 6 piezoelectric oscillators defining an oscillator ensemble capable of providing outputs including each of frequency and phase readings;
b) controller means employing dynamic relationships between said plurality of said oscillators in said ensemble to determine a magnitude of correction needed, and to produce estimated weighting factors for each said frequency and phase reading output from each said oscillator to correct for both said environmental and said systematic effects.

\* \* \* \* \*